US006277456B1

(12) United States Patent
Bulgrin et al.

(10) Patent No.: US 6,277,456 B1
(45) Date of Patent: Aug. 21, 2001

(54) LABELING MEDIA AND METHOD OF MAKING

(75) Inventors: Brian F. Bulgrin, Colgate; Edward J. Loeder, Menomonee Falls; Theodore J. Towler, West Allis, all of WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 09/405,416

(22) Filed: Sep. 24, 1999

(51) Int. Cl.[7] .............................. B32B 3/10; B32B 31/18

(52) U.S. Cl. ........................... 428/40.1; 428/43; 156/270

(58) Field of Search ............................ 283/81, 101, 103, 283/105; 428/40.1, 43, 42.1, 42.2, 42.3, 343; 402/79; 156/270, 269, 268, 267

(56) References Cited

U.S. PATENT DOCUMENTS

| | | | | |
|---|---|---|---|---|
| 3,889,845 | | 6/1975 | Haitmanek | 221/70 |
| 3,921,516 | * | 11/1975 | Toft et al. | 101/91 |
| 4,032,010 | | 6/1977 | Evans | 206/345 |
| 4,234,090 | | 11/1980 | Barbieri et al. | 206/459 |
| 4,361,230 | | 11/1982 | Downing et al. | 206/345 |
| 4,363,401 | | 12/1982 | Savagian | 206/345 |
| 4,415,006 | | 11/1983 | Barbieri | 138/115 |
| 4,442,939 | | 4/1984 | Downing | 206/345 |
| 4,461,793 | | 7/1984 | Blok et al. | 428/36 |
| 4,586,610 | | 5/1986 | Gandolfo | 206/485 |
| 4,603,924 | | 8/1986 | Piana et al. | 312/183 |
| 4,761,086 | | 8/1988 | Peterpaul | 400/531 |
| 4,844,629 | | 7/1989 | Hoyt | 400/583.3 |
| 4,865,895 | | 9/1989 | Vlamings et al. | 428/98 |
| 4,920,882 | | 5/1990 | Hoyt | 400/708 |
| 5,486,063 | * | 1/1996 | Fox et al. | 400/708 |
| 5,509,694 | * | 4/1996 | Laurash et al. | 283/81 |
| 5,536,546 | * | 7/1996 | Nash | 428/43 |
| 5,702,789 | * | 12/1997 | Fernandez-Kirchberger et al. | 428/40.1 |
| 5,862,751 | | 1/1999 | Triantopoulos et al. | 101/35 |
| 5,997,680 | * | 12/1999 | Patent | 156/252 |
| 6,001,209 | * | 12/1999 | Popat et al. | 156/249 |
| 6,186,554 | * | 2/2001 | Raming | 283/81 |

* cited by examiner

*Primary Examiner*—Daniel J. Colilla
(74) *Attorney, Agent, or Firm*—Quarles & Brady LLP

(57) ABSTRACT

A labeling media for electronic printers according to the present invention has labels integral with a carrier strip. The labels are defined by a die cutting process outlining the labels and cutting away portions of the carrier strip adjacent to the labels to allow for release of the labels by hand after being printed. The labels remain attached to the carrier strip at one or more tack points at various locations, which are broken by the user when releasing the labels from the carrier strip. The labels are evenly spaced throughout the length of the carrier strip and are fixed relative to reference guides formed in the carrier strip.

20 Claims, 5 Drawing Sheets

LABELING MEDIA AND METHOD OF MAKING

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to labeling media, and more particularly to labeling media for use in electronic printing devices.

2. Description of the Related Art

There are a number of industrial applications requiring identifying markers for tagging components in complicated assemblies or wiring configurations, such as in aircraft electronics and manufacturing control systems. Wires may be marked very simply by writing an identifiable legend on a tape flag affixed to the wire. An alternate method includes marking the wires with a metal or plastic marker sleeve crimped or otherwise attached to the wire. An electronic printer may be used to provide clearly recognizable alphanumeric labeling. The marker sleeves may be printed on directly, or a label may be printed and inserted in or adhered to the marker sleeve.

Whether it is a label or a sleeve that is printed, the labeling media typically comprises a series of printable portions that are attached to a carrier transport web, also known as a carrier strip. A transport web is generally a thin, flexible supporting member with evenly spaced apertures throughout its length that engage with a drive sprocket or are detected by a photoelectric sensing device for advancing the transport web incrementally past the print head. The transport web is fed through the printer and one or more labels are marked. The labels/sleeves are then removed from the carrier and attached to objects, such as wires, needing identification. As there are many types of label applications, there are many combinations of labels and transport webs that provide labels of varying sizes, colors and formats.

There are a number of U.S. patents that disclose labeling media for use in electronic printing devices in which either a marker sleeve or label is printed on and used for wire identification. These patents generally fall into one of three groups, namely: (1) label markers supported by and adhered to a separate transport web, such as U.S. Pat. No. 4,920,882; (2) label marker sleeves fastened to a separate transport web with a tab-slot or other mechanical fastening arrangement, such as U.S. Pat. No. 4,032,010; and (3) label marker sleeves made of multiple webs, such as U.S. Pat. No. 4,442,939.

The first two groups include separate labels or sleeves which receive the ink marking and a transport web supporting the labels/sleeves. In both cases, the labels/sleeves are removably fixed to the transport web. The difference between the groups principally resides in the way in which the labels/sleeves are joined to the transport web. Labels may be adhered either to a surface of the web or adhered to an adhesive layer backing of the web with the labels disposed in openings in the web. Sleeves, such as the tubular sleeves of the '010 patent, may be joined to the transport web at tab projections sized to fit within the ends of the tubular sleeves. The third group of patents stated above has an assembly of two separate transport webs sealed together along longitudinal and transverse seams. The material is weakened at these seams so that marker sleeves can be broken away from the carrier web.

The above labeling media are assemblies of labels physically connected to a separate transport web in some way. The union of the labels to the web or the use of multiple webs adds to the complexity of producing the labeling media. Furthermore, the multiple components and assembly represent a large percentage of the production cost of the labeling media. Accordingly, a need exists in the art for an economical labeling media for use with a printer such that assembly is simplified or not required.

SUMMARY OF THE INVENTION

The present invention provides a one-piece labeling media having labels integral with a carrier strip, which may be fed through a printer and broken free for use. The labeling media can be economically formed from a single piece of material in a single operation, thus accomplishing the general objective of providing an economical labeling media.

Specifically, the present invention is a labeling media for use in a printer. The labeling media includes a carrier strip for transporting the label through a printer; a label formed in the carrier strip, and having a perimeter defined by cuts through the carrier strip; and a tack point which connects the label to the carrier strip.

The present invention can provide labels of a variety of rectilinear or non-rectilinear configurations, such as rectangular, square, oval or circular for use in desktop printers or portable, hand-held label printers. Additionally, the labeling media can be used with a number of printer formats, including thermal transfer printers, laser printers, ink jet printers, and dot matrix printers. For use with these and other printers, the labels can have at least one surface with an ink receptor coating, thus accomplishing another objective of providing a versatile labeling media.

The labels remain connected to the carrier strip by any number of discrete tack points, at any location, which can be broken free from the carrier strip by any suitable means, such as by hand, to completely separate the label from the carrier strip, thus accomplishing another objective of the present invention of providing a labeling media which is easy to use.

Thus, the present invention provides the object and advantage of a one-piece wire labeling media for use in a printer that has labels integral to the carrier strip so that no assembly is required. Moreover, because the labels can be formed from a die cutting process, their size and shape may be varied easily. Additionally, the labeling media can be used with many standard commercial and consumer printer formats.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENTS

Figure 1:
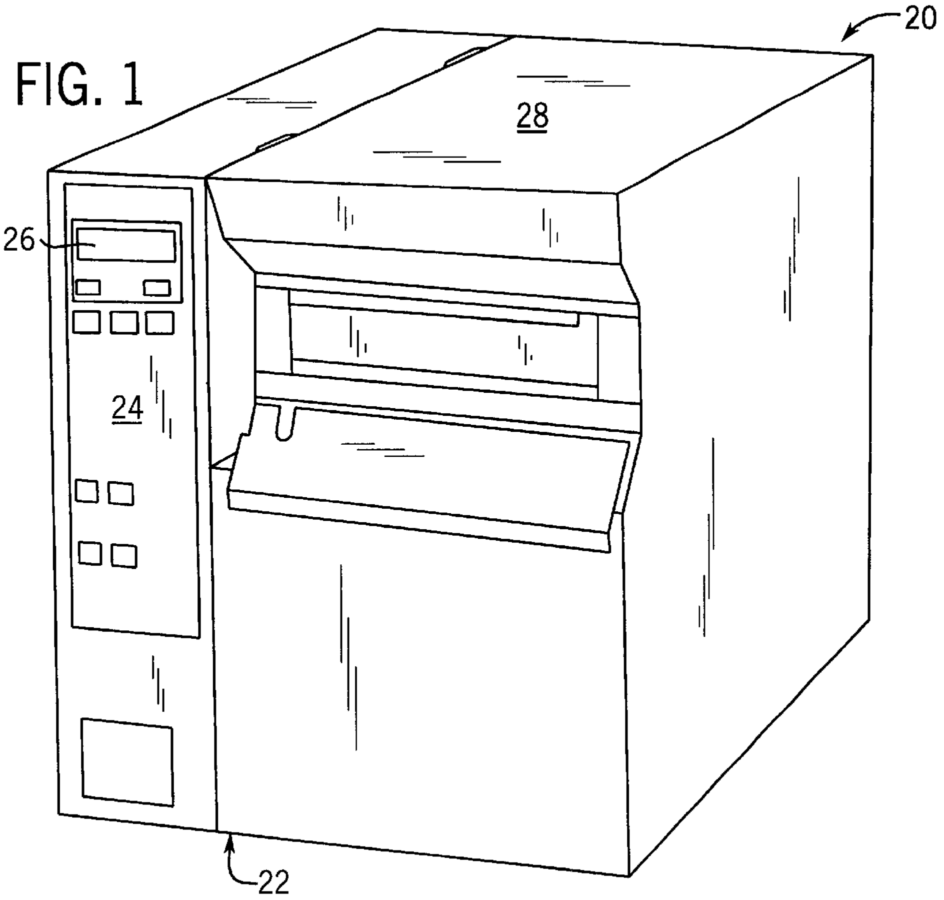
FIG. 1 is a perspective view of a desk top label printer with which the labeling media of the present invention may be used.
Figure 2:
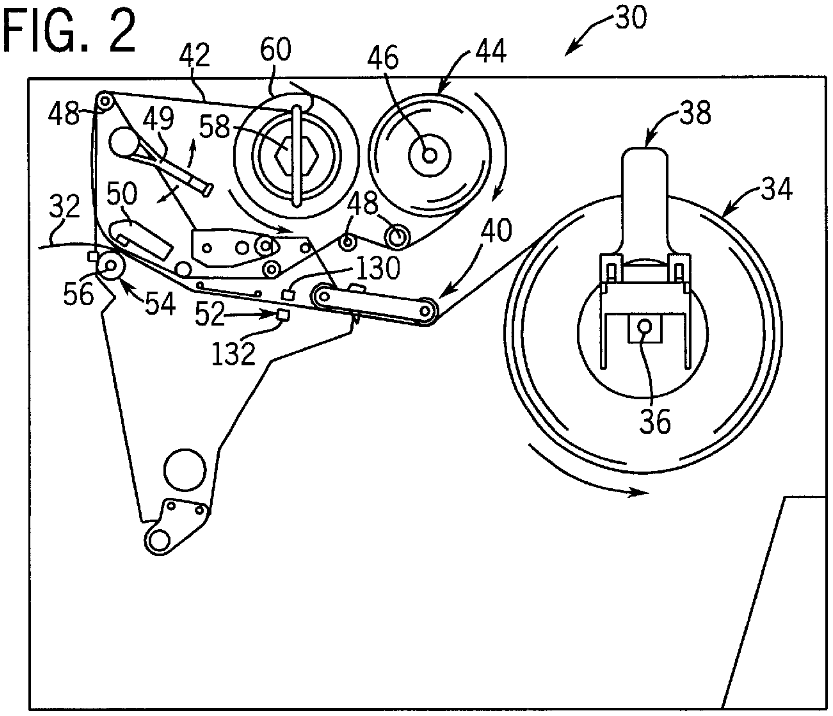
FIG. 2 is a side plan view of the printing mechanism of the desk top label printer of FIG. 1 showing the thermal transfer ribbon and labeling media path.

Referring to FIGS. 1 and 2, a thermal transfer printer 20 suitable for use with the present invention includes a housing 22 having a front control panel 24 with a display 26 and a hinged cover 28. The hinged cover 28 provides access to a printing mechanism 30 enclosed by the housing 22. The printing mechanism 30 urges labeling media 32 and a thermal transfer ribbon 42 past a print head 50 which transfers ink (not shown) from the thermal transfer ribbon 42 onto the labeling media 32 to produce a printed label.

Referring to FIG. 2, the printing mechanism 30 includes the print head 50, a labeling media supply spindle 36, and a ribbon supply spindle 46. Labeling media 32 wound onto a media supply spool 34 is mounted to the media supply spindle 36 which feeds the labeling media 32 to the print head 50. The labeling media 32 is guided toward the print head 50 by a supply spool guide 38 and media guide 40. A thermal transfer ribbon 42 is similarly wound onto a ribbon supply spool 44 and mounted on the ribbon supply spindle 46. Ribbon guides 48 guide the ribbon 42 toward the print head 50. A rotatably driven drive roller 54 pulls the labeling media 32 and thermal transfer ribbon 42 from the respective spools 34, 44, and urges them in close proximity to the print head 50.

A stepping motor (not shown) rotatably drives the drive roller 54 and a ribbon take-up spool 60 to advance the thermal transfer ribbon 42 and labeling media 32 past the print head 50. The drive roller 54 is rotatably mounted on shaft 56, and urges the thermal transfer ribbon 42 and labeling media 32 in close proximity with the print head 50 while advancing the labeling media 32 and ribbon 42 past the print head 50 during the printing process. The labeling media 32 then exits the printer 20 and the ribbon 42 is wound on the ribbon take-up spool 60 which is rotatably mounted on shaft 58.

The print head 50 is arranged to cooperate with the thermal transfer ribbon 42 and the labeling media 32 such that the print head 50 can print characters or symbols on the labeling media 32. This is described in greater detail in U.S. Pat. No. 5,078,523 which is incorporated herein by reference.

More specifically, a lever operated cam mechanism 49 urges the print head 50 into close abutting relation with the labeling media 32 and ribbon 42 captured between a drive roller 54 and the print head 50. Printer circuitry (not shown) energizes the stepping motor to drive the drive roller 54, and advance the labeling media 32 and ribbon 42. When a desired character is input by an operator or other means, the printer circuitry energizes pixels (not shown) on the print head 50 as the labeling media 32 and thermal transfer ribbon 42 advance past the print head 50. The pixels of the print head 50 are variously energized to imprint the character on the labeling media 32.

As the labeling media 32 advances past the print head 50 during printing, it passes a photoelectric sensor 52 which is electrically connected to the printer circuitry. The sensor 52 includes a transmitter 130 and a receiver 132 disposed on opposing sides of the labeling media advancing past the print head 50. Reference guides (discussed in further detail below) formed in the labeling media are detected by the sensor to properly advance and align the labeling media 32 with the print head 50 during printing.

Figure 3:
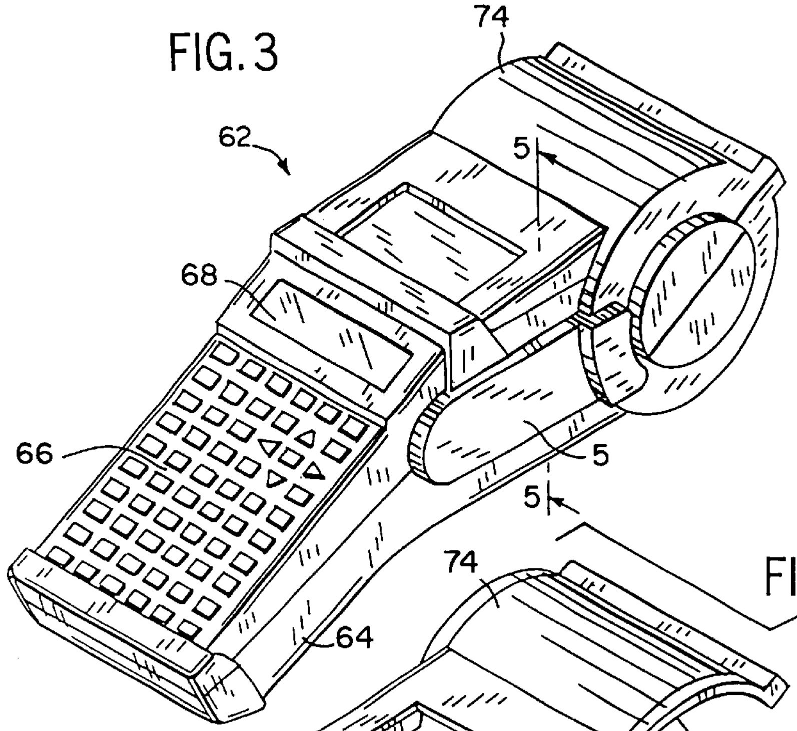
FIG. 3 is a perspective view of a hand held label printer with which the labeling media of the present invention may be used.
Figure 4:
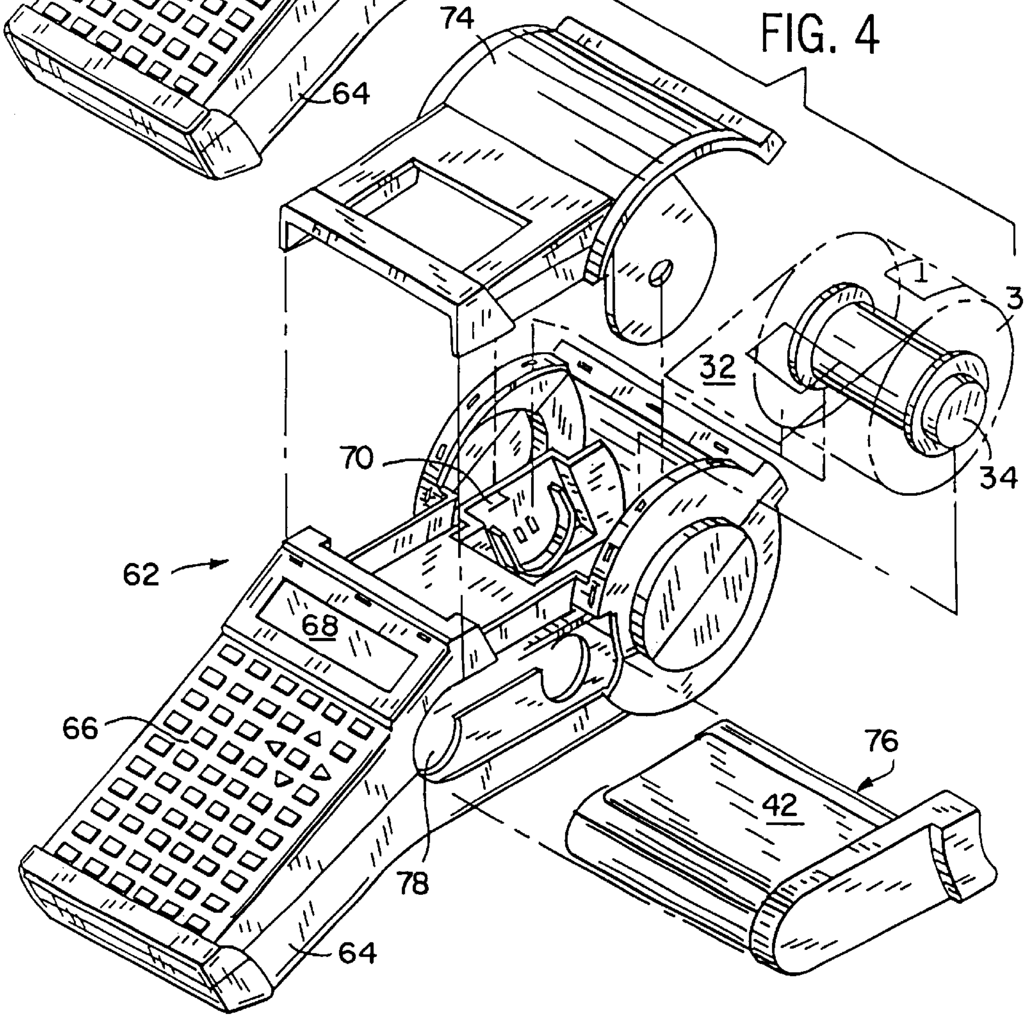
FIG. 4 is an exploded perspective view of the printer in FIG. 3.

An alternate printer suitable for use with the present invention will be described below. In the following description of the alternate printer, components substantially equivalent to the table top printer are assigned the same reference number. Referring now to FIGS. 3 and 4, an alternate thermal transfer printer 62 for hand-held use includes a molded plastic housing 64 that supports a keyboard 66 on its front surface and a display 68 positioned above the keyboard 66. A cavity 70 formed in the housing 64 above the display 68 receives a media supply spool 34 containing the labeling media 32 formed as a roll. The spool 34 is inserted into the cavity 70. A cover 74 enclosing the spool 34 in the cavity 70 is pivotally attached to the housing 64.

Figure 5:
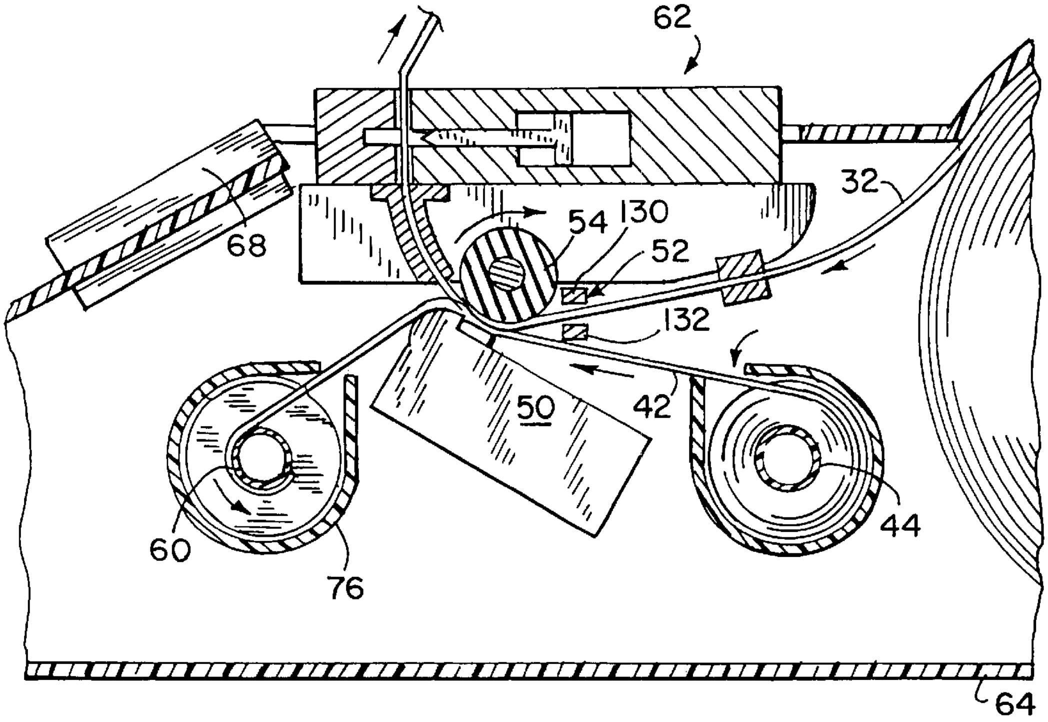
FIG. 5 is a cut-away cross-sectional view taken along line 5—5 of FIG. 3 showing the thermal transfer ribbon and printing mechanism of the hand held label printer of FIG. 3.

A thermal transfer ribbon cartridge 76, shown in FIGS. 4 and 5, containing a thermal transfer ribbon 42 is inserted into a cavity 78 in the side of the printer housing 64, and received by a print frame assembly (not shown). The ribbon cartridge 76 rotatably accommodates a ribbon supply spool 44 containing the ribbon 42 and a ribbon take-up spool 60 for taking up the ribbon 42 as it is used in the thermal transfer printing process. The ribbon cartridge 76 as used with this invention is fully described in copending U.S. patent application Ser. No. 09/033,341 filed on Mar. 2, 1998 and incorporated by reference herein.

The labeling media 32 and ribbon 42 are advanced through the printer 62 by a stepping motor (not shown) and drive roller 54, such as described above with respect to the desk top embodiment. Also as described above, the labeling media 32 and ribbon 42 are in intimate contact with a similarly configured thermal transfer print head 50 during printing. As in the table top embodiment shown in FIGS. 1 and 2, a sensor 52 having a sensor transmitter 130 and receiver 132 controls advancement of the labeling media 32 and ribbon 42, as will be described below.

Figure 6:
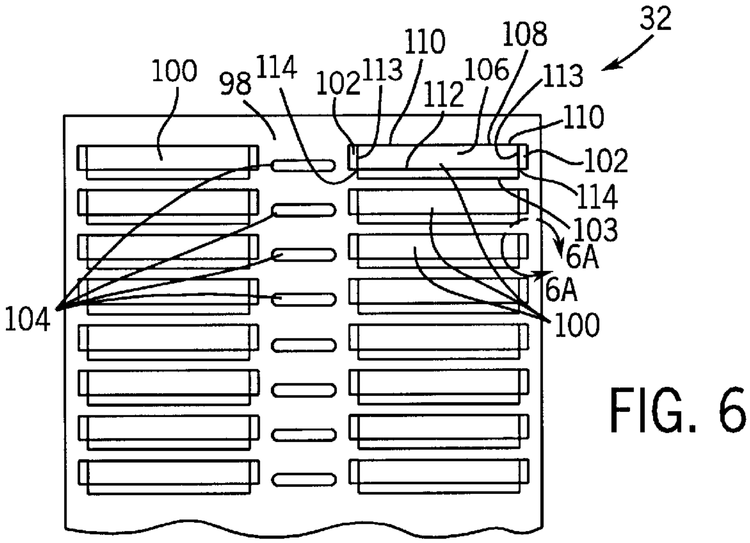
FIG. 6 is a cut-away front plan view of a preferred embodiment of the labeling media of the present invention for use with the desktop printer of FIG. 1.

For illustrative purposes only, the labeling media and printer operation will be described with reference to the printer disclosed in FIGS. 1 and 2. However, it should be understood, that the labeling media 32 and use thereof with the printer disclosed in FIGS. 3–5, is substantially similar. Referring to FIG. 6, the labeling media 32 includes labels 100 formed as an integral part of a carrier strip 98. Forming the labels 100 as an integral part of the carrier strip 98 provides a labeling media 32 which can be formed from a single piece of material in a single operation, such as by die cutting. This feature simplifies the label manufacturing process to provide an economical labeling media.

Preferably, the labeling media 32 is made from material known in the art for printing, such as filled polypropylene. Advantageously, filled polypropylene can be extruded and spooled to any length required for a particular printer application. The surface of the polypropylene material is suitable for thermal transfer printing such that no coating is required, however, an ink receptor top coat can be applied to the labeling media to define a printing surface. Although filled polypropylene is preferred, the labeling media material may be any material known in the art in which labels can be defined by cutting. For example, suitable material for use with the present invention includes paper, laminate material having a release liner, and the like.

The labeling media 32 width may be of any suitable lateral dimension, but typical sizes include widths between 0.75 and 3.5 inches. For example, the narrower widths would be more suitable for a hand held printer, while a larger printer can accommodate a wider labeling media. Preferably, the labeling media 32 is approximately between 15–25 mils thick. This thickness range provides a suitable balance of the opposing requirements that the labeling media 32 be flexible enough to pass through a printer, such as disclosed herein, but be sufficiently robust so that labels 100 may be easily handled and inserted into label carriers 150 (see FIG. 14) during use. However, the invention is not limited to labeling media having the above dimensions. For example, labeling media thicker than described above, may be desired if flexibility of the carrier strip is not as important as stiffness of a printed label. The size, color, and labeling media material can vary depending upon the particular printing application.

In a preferred embodiment shown in FIG. 6 for use in a large printer, such as shown in FIGS. 1 and 2, two columns of generally rectangular labels 100 are die cut in the carrier strip 98. Preferably, the labels 100 are uniformly spaced along the carrier strip 98 length. The carrier strip 98 transports the labels 100 through the printer 20, and cooperates with the printer 20 to properly align each label 100 for printing.

Reference guides 104 evenly spaced along the length of the carrier strip 98, cooperate with the sensor 52 (shown in FIG. 2) to properly align each label 100 with respect to the print head 50 as the printer 20 (shown in FIG. 1) consumes the labeling media 32. The reference guides 104 provide registration locations for the sensor 52 within the printer 20 to control advancement of the labeling media 32 through the printing mechanism 30, and ensure the labels 100 are properly aligned with the print head 50 during printing. In the preferred embodiment, the reference guides 104 are slots disposed between the columns of labels 100. However, as disclosed below, any shape, such as notches formed in an edge of the carrier strip may be used, or even release cuts, further defined below, can be used as reference guides.

Figure 6A:
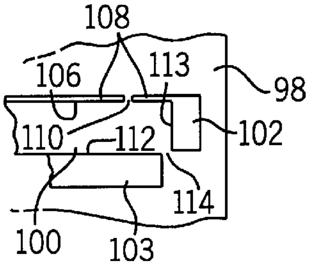
FIG. 6A is an exploded view of a label end along line 6A—6A of FIG. 6.

Referring to FIGS. 6 and 6A, each label has a leading edge 106, trailing edge 112, and sides 113 joining the leading and trailing edges 106, 112. The leading edge 106 is defined by a cut line 108 formed during the die cutting process along the label edge which is first to encounter the print head 50 (shown in FIG. 2). The cut line 108 extends between the label sides 113, and separates the label 100 from the carrier strip 98 across the leading edge 106. As best shown in FIG. 6A, the cut line 108 is non-continuous to form tack points 110 interrupting the cut line 108 which connect the label leading edge 106 to the carrier strip 98.

Side release cuts 102 formed at each label side 113 define the lateral ends of the label 100, and facilitate separation of the label 100 from the carrier strip 98. Each side release cut 102 extends from the label leading edge 106 to just short of the label trailing edge 112 along each side 113 of the label 100. These side release cuts 102 are formed by removing media material adjacent the label 100. Removing the media material adjacent the label 100 prevents distorting or wrinkling the label 100 during the die cutting process.

Similarly, a trailing edge release cut 103 is formed at the trailing edge 112 of the label 100 to define the label trailing edge 112, and facilitate separation of the label 100 from the carrier strip 98 after printing. The trailing edge release cut 103 extends slightly less than the width of the labels 100 to define tack points 114 at the junction of the trailing edge 112 and each label side 113. As in the leading edge tack points 110, the trailing edge tack points 114 connect the label 100 to the carrier strip 98.

Referring to FIGS. 2, 5 and 6, depending upon the construction of the printing mechanism 30, the labeling media 32 may be required to flex through relatively small radii while advancing toward the print head 50 or unwinding from the labeling media supply spool 34. As a result, the labels 100 may bow or flex laterally with respect to the carrier strip 98 about the tack points 110, 114. If the print head 50 is mounted as a floating head, it may not be possible to adequately flatten the labels 100 against the print head 50, which may degrade print quality. In such applications, additional tack points at other locations, such as the lateral mid-points and ends, may be needed to more adequately unite the labels 100 and the carrier strip 98.

In use, referring to FIGS. 2 and 6, the printing mechanism 30 indexes each label 100 past the print head 50 by the drive roller 54 rotatably driven by the stepping motor. The stepping motor, and thereby the drive roller 54, is controlled in part by the sensor 52, which detects the reference guides 104 formed in the carrier strip 98.

The sensor 52 detects the opaqueness of the advancing labeling media 32. As long as the sensor 52 detects the opaque media of the carrier strip 98 or labels 100, the stepping motor is energized at a prescribed voltage and the drive roller 54 rotates a prescribed distance sufficient to position the labels 100 adjacent to and in contact with the print head 50. When a reference guide 104 passes between the sensor transmitter 130 and receiver 132, the motor is energized at a second prescribed level as the label 100 passes by the print head 50 and is printed. Thus, although appearing to travel continuously at a constant rate, the labeling media 32 actually advances through the printer 20 (shown in FIG. 1) in a step-wise fashion at an overall rate of approximately 3–4 inches per second.

Referring to FIGS. 6–13, after the printing process the labels 100 can be released from the carrier strip 98 by cutting or breaking the tack points 110. Due to the small amount of media comprising the tack points 110, the labels 100 may be easily broken free from the carrier strip 98 by hand. Once the labels 100 are separated from the carrier strip 98, they may be affixed to a component of a machine or other structure requiring identification.

Figure 14:
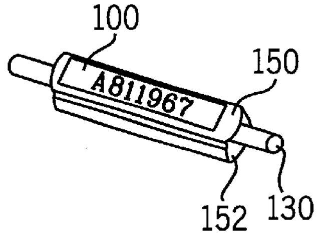
FIG. 14 is a perspective view of a label inserted into a marker sleeve attached to a wire.

Referring to FIG. 14, when labeling wires 130, the label 100 may be inserted into a sleeve of a transparent label carrier 150 having legs 152 defining a semi-cylindrical channel for receiving and attaching to the insulated shaft of the wire 130. The present invention is not limited in this regard, however, as the labels may be affixed by any suitable means to wires or any other elements.

The labels 100 can be formed in the carrier strip 98 to provide a variety of alternate embodiments, some of which are shown in FIGS. 7–13 and are discussed below. In the alternate embodiments, the carrier strip 98 may have different widths and lengths and include labels 100 of various shapes and sizes. Although possibly having a different form, common elements, such as the carrier strip 98, labels 100, release cuts 102, and reference guides 104 are designated using the same reference as in the first embodiment.

Figure 7:
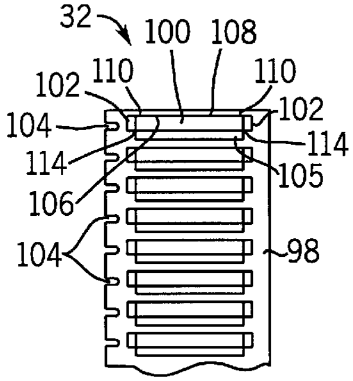
FIGS. 7–13 are cut-away front plan views of alternative embodiments of the labeling media of the present invention.

Referring to FIG. 7, in an alternate embodiment, a single column of labels 100 is formed in the carrier strip 98. As in the embodiment shown in FIG. 6, each label 100 is defined by the cut line 108 and release cuts 102, 103 and connected to the carrier strip 98 by two tack points 110 at the leading edge 106 and two tack points 114 at the trailing edge 112. However, in this embodiment, the reference guides 104 are notches formed along a side of the carrier strip 98.

Figure 8:
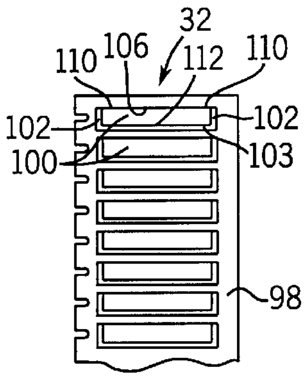

In another alternate embodiment of the present invention, shown in FIG. 8, each label 100 has a trailing edge release cut 103 which intersects with the side release cuts 102. The intersecting release cuts 102, 103 free the label trailing edge 112 from the carrier strip 98. Thus, only the two tack points 110 at the label leading edge 106 connect the label 100 to the carrier strip 98, thus simplifying separating the label 100 from the carrier strip 98.

Figure 9:
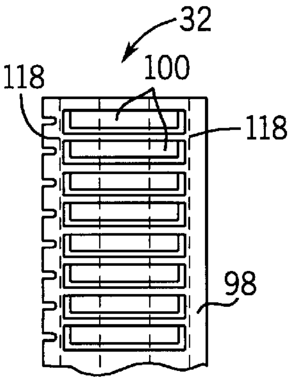
Figure 10:
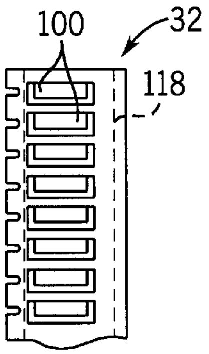

Another embodiment shown in FIGS. 9 and 10, as applied to the embodiment of FIG. 8, includes a thin layer of an adhesive tape 118, such as splicing tape and the like, applied to a surface of the labeling media 32 across at least a portion of each label 100 and the carrier strip 98. This will provide a backing support for the labeling media 32 to ensure the labels 100 and the carrier strip 98 flex consistently. The adhesive tape 118 can be applied in multiple longitudinal (FIG. 9) or lateral strips, or as a single strip (FIG. 10), according to the lateral dimension of the labeling media 32 and the adhesive tape 118. As an alternative to applying the adhesive tape 118, an adhesive can be applied to the labeling media 32, and protected by a release liner (not shown).

Figure 11:
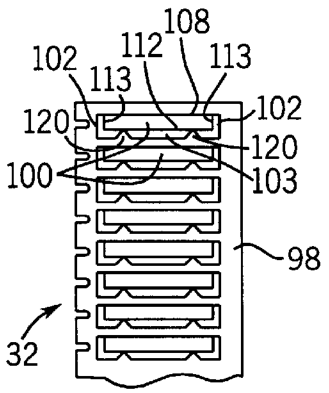

Referring now to FIG. 11, in yet another embodiment of the present invention, each label 100 is defined by the leading edge cut line 108, and the release cuts 102, 103 as in the first embodiment. However, the trailing edge release cut 103 defines two triangular projections 120 forming tack points at the label trailing edge 112 inward from each label side 113.

Figure 12:
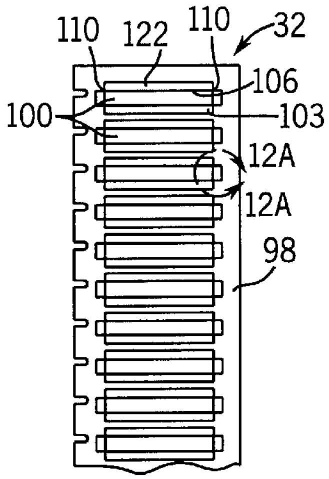
Figure 12A:
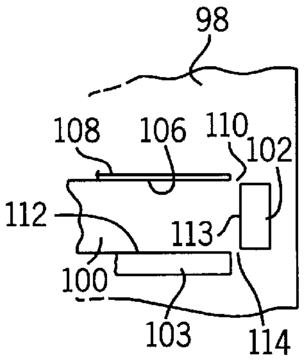
FIG. 12A is an exploded view of a label end along line 12A—12A of FIG. 12.

In another embodiment shown in FIGS. 12 and 12A, the labels 100 are substantially identical to the embodiment of FIG. 7, except the leading edge 106 of each label 100 is defined by a leading edge release cut 122 substantially identical to the trailing edge release cut 103 to form the tack points 110 connecting the label leading edge 106 to the carrier strip 98.

Figure 13:
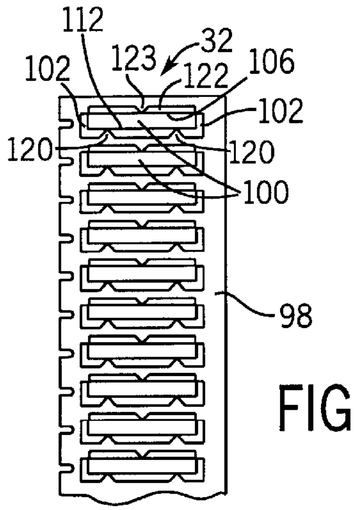

Referring now to FIG. 13, the labels 100 are substantially identical to the embodiment of FIG. 11, except the label leading edge 106 is defined by a leading edge release cut 122 which extends slightly less than the width of the labels 100 to define tack points 110 at the junction of the leading edge 106 and each label side 113, and defines a triangular projection 123 proximate the lateral midpoint of each label 100. The triangular projection 123 tapers in a direction opposite the projections 120 formed at the label trailing edge 112, and is a tack point which connects the label leading edge 106 to the carrier strip 98.

Referring again to FIGS. 1, 2, 3, and 6, preferably, labeling media 32 having multiple columns of labels 100 are used with the desktop printer 20 and the single column embodiments are used in the hand-held printer 62. The larger size of the desktop printer 20 permits the use of wider labeling media 32 having multiple columns of labels 100, thus allowing multiple labels 100 to be printed on each pass by the pixel line of the print head 50. However, the single column embodiments may be used in both the desktop 20 and hand-held printers 62. Referring also to FIGS. 7–13, when a single column labeling media 32 is used in the desktop printer 20, the trailing edge release cut 103 (or leading edge release cut 122 depending upon embodiment) can be used as a guide by the sensor 52 for advancing the labeling media 32 through the printer 20 and properly positioning the labels 100 next to the print head 50 during printing.

Various methods known in the art may be used to practice the present invention as disclosed herein. The preferred embodiment discussed above discloses labeling media for use in a thermal transfer printer. However, the labeling media of the present invention may also be used with other printer formats such as dot matrix, laser and ink-jet style printers. In particular, due to the projecting pin print head arrangement of known dot matrix printers, small, hand-held dot matrix printers could operate without securing the labels at additional tack points or adding an adhesive layer as may be needed in hand-held thermal transfer printers.

Additionally, it is also within the scope of the invention for the labeling media to include labels having other rectilinear or non-rectilinear configurations, such as square, oval or circular. Moreover, although the drawings illustrate embodiments with two, four, and five tack points, embodiments with one, three, or more than five tack points are also within the scope of the present invention. Similarly, the location of the tack points shown in the figures is not intended to limit the scope of the invention. Lastly, the labeling media is shown as having one column or two columns of labels, however, the invention includes labeling media having three or more of such columns and one or more columns of reference guides.

Thus, while the foregoing specification illustrates and describes the preferred embodiments of this invention, it is to be understood that the invention is not limited to the precise construction herein disclosed. The invention can be embodied in other specific forms without departing from the spirit or essential attributes. For example, the carrier strip can be a standard A4 or 8.5"×11" sheet of labeling media material which is fed through a printer. Accordingly, reference should be made to the following claims, rather than to the foregoing specification, as indicating the scope of the invention.

We claim:

1. A labeling media for use in a printer, comprising:

a carrier strip;

a label formed in said carrier strip, and having a perimeter defined by a plurality of discontinuous cuts through said carrier strip, wherein said carrier strip surrounds said defined label, and at least one of said cuts is defined by material removed adjacent to said label, such that an empty space is formed adjacent said label; and at least one tack point connecting said label to said carrier strip, wherein said label is separable from said carrier strip by breaking all of said tack points.

2. The labeling media of claim 1, including a reference guide formed in said carrier strip for detection by a sensor in a printer.

3. The labeling media of claim 2, in which said reference guide is a slot formed in said carrier strip.

4. The labeling media of claim 2, in which said reference guide is a notch formed in a side edge of said carrier strip.

5. The labeling media of claim 2, in which said reference guide is a release cut defining said perimeter of said label.

6. The labeling media of claim 1, in which said label has an ink receiving surface.

7. The labeling media of claim 6, in which said ink receiving surface has an ink receptor coating for receiving ink during a printing process.

8. The labeling media of claim 1, including a layer of adhesive disposed on a surface of said label.

9. The labeling media of claim 1, including adhesive tape attached to a surface of said label.

10. The labeling media of claim 1, in which said label is rectangular.

11. The labeling media of claim 1, in which a plurality of labels are formed in said carrier strip.

12. The labeling media of claim 11, in which said plurality of labels define columns extending along the length of said carrier strip.

13. The labeling media of claim 1, is formed by defining at least one corner of said label perimeter with adjacent cuts which do not intersect, thereby maintaining said label as an integral part of said carrier strip.

14. A method of forming labels in labeling material comprising the steps of:

providing labeling media material;

cutting through said media material to define a label having a perimeter surrounded by a carrier strip formed from said labeling media material, wherein said cutting is not continuous so as to form tack points connecting said label to said surrounding media material, and said cutting removes material adjacent to said label, such that an empty space is formed adjacent said label.

15. A method as in claim 14, including forming reference guides in said media material for detection by a printer sensor.

16. The method as in claim 14, including coating a surface of said label with an ink receptor coating for receiving ink during a printing process.

17. The method of claim 14, including applying an adhesive to a surface of said label.

18. The method of claim 14, including applying adhesive tape to a surface of said label.

19. The method of claim 14, in which said cutting defines a rectangular label.

20. The method of claim 14, in which said cutting defines a plurality of label perimeters in said labeling material.

* * * * *